(12) United States Patent
Maier, Jr. et al.

(10) Patent No.: US 7,395,780 B2
(45) Date of Patent: Jul. 8, 2008

(54) MILK COLLECTING PIECE WITH A KINK ELEMENT FOR DEFINED KINKING OF A MILK TUBE

(76) Inventors: Jakob Maier, Jr., Griesstrasse 4, D-86842 Tuerkheim (DE); Wilfried Hatzack, Schelmengriesstrasse 1, D-86842 Tuerkheim (DE)

( * ) Notice: Subject to any disclaimer, the term of this patent is extended or adjusted under 35 U.S.C. 154(b) by 411 days.

(21) Appl. No.: 10/505,739

(22) PCT Filed: Feb. 24, 2003

(86) PCT No.: PCT/EP03/01866

§ 371 (c)(1),
(2), (4) Date: May 26, 2005

(87) PCT Pub. No.: WO03/069981

PCT Pub. Date: Aug. 28, 2003

(65) Prior Publication Data

US 2005/0223999 A1    Oct. 13, 2005

(30) Foreign Application Priority Data

Feb. 25, 2002   (DE) ............................... 102 07 955

(51) Int. Cl.
*A01J 1/00* (2006.01)
(52) U.S. Cl. .................................................. 119/14.47
(58) Field of Classification Search ... 119/14.45–14.47, 119/14.52, 14.51, 14.53, 14.11–14.14, 14.18, 119/14.36–14.39, 14.54, 14.55
See application file for complete search history.

(56) References Cited

U.S. PATENT DOCUMENTS 1,408,694 A * 3/1922 Laurits ........................ 141/302
2,853,051 A * 9/1958 Bauer ........................ 119/14.45
2,896,573 A * 7/1959 Schalm et al. ........... 119/14.36
4,869,205 A   9/1989 Larson
6,298,807 B1 * 10/2001 Terwilleger ............... 119/14.16

(Continued)

FOREIGN PATENT DOCUMENTS

DE          1 607 023 A      8/1970

(Continued)

*Primary Examiner*—Thomas Price
(74) *Attorney, Agent, or Firm*—Flynn, Thiel, Boutell & Tanis, P.C.

(57) ABSTRACT

A milk collecting piece comprises a kink element having a bending edge which ensures reliable kinking and thus maintenance of the operating vacuum in milk tubes which are guided outwards in a direction oblique to the longitudinal axis. In one embodiment, the milk collecting piece comprises a connection surface provided with an opening into which an end portion of the milk tube is introduced, so that a reliable function is obtained due to the provision of the kink element, whereby due to the manner in which the milk tube is mounted on the collecting piece, a smaller amount of milk coating collects and deposits on transition areas. In a further embodiment, the bending edge of the kink element is positioned in such a manner that said edge efficiently prevents the milk tube from getting detached from connection elements which are guided outwards in an oblique manner, and ensures vacuum-tight kinking of the milk tube at the same time. Furthermore, a kink element is described which is to be fastened in a simple manner or with only slight constructional modifications to already existing milk collecting pieces.

43 Claims, 4 Drawing Sheets

U.S. PATENT DOCUMENTS

| | | | |
|---|---|---|---|
| 6,401,655 B1 * | 6/2002 | Terwilleger | 119/14.54 |
| 6,742,475 B1 * | 6/2004 | McLeod et al. | 119/14.49 |
| 6,895,891 B2 * | 5/2005 | Maier et al. | 119/14.51 |
| 2004/0025794 A1 | 2/2004 | Maier, Jr. et al. | |

FOREIGN PATENT DOCUMENTS

| | | |
|---|---|---|
| DE | 32 17 865 A1 | 1/1983 |
| DE | 100 22 716 A1 | 11/2001 |
| WO | WO 00/69252 A1 | 11/2000 |

* cited by examiner

MILK COLLECTING PIECE WITH A KINK ELEMENT FOR DEFINED KINKING OF A MILK TUBE

FIELD OF THE INVENTION

The present invention relates to automatic milking systems used in agriculture, and particularly to a milk collecting piece comprising a plurality of connection portions for flexible milk tubes, wherein a longitudinal axis is defined in the milk collecting piece and milk tubes are mounted on the collecting piece in a direction oblique to the longitudinal axis. Furthermore, the present invention relates to a kink element for a milk collecting piece.

BACKGROUND OF THE INVENTION

When animals, for instance cows, are milked by machines, vacuum-operated automatic milking systems are predominantly used, wherein with the help of teat cups mounted on the teats of the animals and connected by means of milk tubes to a so-called milk collecting piece, the milk obtained by milking is guided into a central container or into a central conduit. In this milking operation by way of a machine, it is important for the farmer to achieve, on the one hand, a constantly high milk yield and to satisfy, on the other hand, the strict hygienic requirements prescribed by the legislator to the milk producer. Consequently, it is important that the functionality of the automatic milking system provides for both a high degree of wellbeing for the animal to be milked, whereby a high yield is ensured, and a construction which allows for a rapid and efficient cleaning of the system.

An important component of the automatic milking system is the milk collecting piece in which the milk obtained by milking from the individual teats of the animal is collected and then transported into a central conduit. The milk collecting piece is connected by means of flexible milk tubes to the corresponding teat cups and is suspended during milking, due to its own weight, underneath the udder of the animal. Due to the tight mechanical coupling of the milk collecting piece by means of the flexible milk tubes with the udder of the animal, the properties of the milk collecting piece as well as the corresponding connection portions leading to the milk tubes have an effect on the operational characteristics and thus the efficiency of the automatic milking system. Especially during milking and due to the pressure variations generated by the pulsed operation of the milking system, which are required for folding and unfolding the teat rubber in the teat cup, there is a corresponding movement of the milk collecting piece. Depending on the configuration of the milk collecting piece and the milk tubes, a movement of the milk collecting piece can be used in a positive way for stimulating the animal, or the milking operation gets impaired because certain movements are unpleasant for the animal and may thus lead to a premature contraction of the corresponding muscles and thus to a premature end of the milk flow.

A further critical situation arises during the milking operation when a teat cup falls off from the teat or when at the beginning or at the end of the milking operation the teat cups are to be attached to or removed from the teat. Since the milking vacuum is applied to each teat cup and since this vacuum should remain as constant as possible, a removal or a falling off of the teat cup leads to a decline in the milking vacuum, which in turn may lead to a falling off of the remaining teat cups. This also poses problems during removal of the teat cup because not all of the teat cups can normally be removed at the same time so that there is always the risk that the teat cups that are still in the operative position will fall off and thus get soiled. Due to these problems, the milk collecting pieces are designed in many existing milking systems such that the flexible milk tubes which hang downwards due to the weight of the teat cup are kinked in a defined way and thus form an essentially vacuum-tight kink, so that the milking vacuum is hardly impaired on the remaining teat cups.

In a known milking system, the milk collecting piece is designed such that exit openings are provided on the top side of the milk collecting piece for the milk tubes, which thereby leave the milk collecting piece essentially in vertical direction, so that a maximum inner diameter is obtained during operation for the transportation of the milk obtained by milking. Furthermore, a predetermined kink is provided on the milk tube spaced apart from the opening, the kink producing an increased flexibility of the milk tube through a reduced wall thickness of the tube. Furthermore, a kink bracket is provided near the opening so that in the suspended state of teat cups the predetermined kink of the milk tube is positioned above the bracket edge, which ensures a defined kinking and substantially also a sealing of the milk tube. However, the vertical position of the milk tubes in the operative position has the effect during the milking operation that small vertical and also lateral movements of the milk collecting piece, which are e.g. generated by the previously mentioned pressure variations, have a direct effect on the animal's teat. This has the additional effect that even slight positional changes in the milk collecting piece on a specific teat, e.g. during "upward climbing" of the teat cup, have a direct effect on the milk collecting piece and thus indirectly also on the other teats. This may entail a significant negative effect on the animal's wellbeing and thus on the milk output. Furthermore, in said known milking system the kink brackets are mounted very close to the openings receiving the milk tubes, so that during assembly or disassembly of the milk tubes much time and considerable efforts are spent. This has the effect that the willingness to remove the milk tubes for a thorough cleaning process declines considerably.

In a further known milk collecting piece, connection elements are e.g. provided for the milk tubes, the connection elements being arranged in oblique fashion with respect to the longitudinal axis of the milk collecting piece. It should here be noted that in the further description and in the claims the longitudinal axis of a milk collecting piece is defined as an axis coinciding with the vertical if the milk collecting piece is in the operative position and does not perform any movement. The operative position is defined as the position in which the milk collecting piece is fastened by means of the milk tubes and the teat cups to the animal's udder and is suspended vertically downwards due to the dead weight of the whole milking equipment.

Together with correspondingly formed milk tubes, which may e.g. have a portion with a bellows-like structure, the connection elements mounted obliquely relative to the longitudinal axis achieve an attenuating action for lateral movements and also for movements along the longitudinal axis. Said attenuating action is effected by a bending of the milk tubes which is enforced by the oblique arrangement of the connection elements. Furthermore, the end of the connection element simultaneously serves as a kink edge, so that the inner diameter will be deformed significantly when the milk tube, e.g. due to the teat cup's own weight, is pulled downwards. However, it has been found that the milk tube is often not sealed in an absolute and reliable manner because a pronounced predetermined kink is omitted in the tube so that the attenuating action of the tube bend is not impaired during the milking operation. Furthermore, it has turned out that upon kinking of the milk tube said tube partly detaches from the bottom side of the connection element so that milk residues may collect at said place, thereby constituting a potential risk for the hygienic state of the milk. This is particularly the case when during cleaning of the milking system the milk tube is in the unkinked state and the relevant portion on the connection element is thus not cleaned.

Due to the above-illustrated situation, it is an object of the present invention to improve an automatic milking system such that the milking operation can be performed more efficiently, especially when the teat cups are attached or removed and the demands made on hygienic standards can be satisfied more easily.

SUMMARY OF THE INVENTION

According to the invention said object is achieved by a milk collecting piece for an automatic milking system comprising several connection portions for flexible milk tubes and a longitudinal axis, wherein first end portions of the milk tubes are mounted on the milk collecting piece obliquely relative to the longitudinal axis, and wherein a kink element is further provided with a bending edge spaced apart from the connection portion, the bending edge defining a bending portion in the milk tube.

With the milk collecting piece of the invention the advantages of an oblique fastening of the flexible milk tubes to the milk collecting piece can be combined with an exactly defined bending edge, so that the attenuating action of the flexible milk tubes that are curved upwards during the milking operation is maintained, and wherein on the other hand the bending edge spaced apart from the connection portion exactly defines a bending portion or kink portion in the milk tube, so that a reliable vacuum-tight constriction of the milk tube is carried out. In contrast to the known milk collecting piece with an oblique connection element in which the whole end of the connection element serves as a bending portion and does thus not define an exact bending portion of the milk tube, the bending edge of the present invention permits a defined kinking, with the inner diameter being deformed such that upper and lower portions of the milk tube rest on one another or are at least so closely spaced apart that they fully and tightly adhere to one another due to the prevailing milking vacuum.

In a further embodiment, first end portions of the milk tubes that can be mounted on the milk collecting piece enclose an angle of more than 10° with the longitudinal axis in the direction defined by the operative position of the milk collecting piece.

With an angular range of more than 10°, i.e. when the end portions of the milk tubes enclose an angle of more than 10° with the upwardly directed vertical when the milk collecting piece is in the operative position, an adequate curvature of the milk tube is achieved during the milking operation so that the attenuating or compensating effect of the milk tube on uncontrolled movements of the milk collecting piece is heightened. Preferably, the angle is 30° to 70°.

In a further embodiment, each bending edge is movable from a first position in which the bending edge is positioned to kink the milk tube, into a second position in which the bending edge is spaced apart from the milk tube such that the connection portion is accessible for assembly or disassembly of the milk tube.

With this configuration each bending edge can be moved from the operative position into a second position in which the milk tubes can be assembled or disassembled rapidly. Hence, a user is enabled to thoroughly clean the milk tube and the connection portions of the milk collecting piece in an easy and rapid manner.

In a further embodiment, the kink element is movable in such a way that some or all of the plurality of bending edges can be moved from the first position into the second position at the same time.

Said embodiment permits an even more rapid assembly or disassembly of the milk tubes for a thorough cleaning or for replacement of the milk tubes.

In accordance with one embodiment, the kink element is rotatably fastened to the milk collecting piece. This permits a simple mechanical construction which makes it for instance possible to design the kink elements as an annular element or an annular segment element, the bending edges being here movable from the first position into the second position by rotating the kink element.

In a preferred embodiment, the kink element can be removably fastened to the milk collecting piece. The kink element can thereby be disassembled in an easy way, and no constructional measures or only slight ones for mounting the kink element are needed on the milk collecting piece. This is particularly advantageous when the kink element must be provided on already existing milk collecting pieces.

In a further embodiment, the kink element is displaceable from the first position into the second position in a vertical direction relative to the operative position.

Said embodiment permits an easy mounting of the kink element; the adhesion may here be adequate, for instance, due to friction so that, if needed, only slight or even no constructional changes or measures are required on existing milk collecting pieces. The position of the kink element can then be changed rapidly, for instance by vertical displacement.

In a further embodiment, the kink element comprises several bending-edge holding segments.

In a further embodiment, each bending-edge holding segment is movably mounted on the kink element.

According to this embodiment each bending edge may be moved individually, for instance from the first position into the second position, so that a rapid access to an individual milk tube is possible without affecting the mechanical construction of the remaining milk tubes and the bending-edge holding segments.

In a further embodiment, each bending-edge holding segment comprises a rotating and/or folding mechanism, or each bending-edge holding segment is displaceable so that each bending-edge holding segment is movable from the first position into the second position. This embodiment permits a simple mechanical configuration, the individual bending edges being movable from the first position into the second position rapidly and without any problems.

In a further embodiment, the kink element comprises a locking means with which each bending-edge holding segment can be locked in the first position. The locking means guarantees a reliable holding of the bending edges in the first position so that the function of the bending edge during the milking operation and during removal and attachment of the teat cups is ensured.

Preferably, the locking means is configured to lock all bending-edge holding segments in the first position at the same time.

In a further embodiment, the kink element comprises a deformable portion, so that the kink element can be fastened in a removable manner to the milk collecting piece by deformation of the deformable portion and/or can be locked in the first position.

Due to the provision of a deformable portion, e.g. in the form of an elastic portion or a spring element which partly encompasses the kink element, the kink element can be fastened in a simple and reliable manner to the milk collecting piece, e.g. in the first position. Furthermore, with this embodiment, the shape and thus the portion that is in contact with the milk collecting piece can e.g. be changed, so that a movement or a mounting of the kink element is possible in a simple way.

Preferably, a closing element is provided for detachably fastening the kink element.

With the closing element; two sub-portions, e.g. in the form of semi-annular segments, can e.g. be connected in a reliable manner, resulting in a mechanically simple construction that is operative in a rapid and reliable manner.

In a further variant, at least two sub-portions are provided that are movable relative to one another by means of a deformable portion connecting the two sub-portions.

In a further embodiment, the deformable portion comprises an elastic material and/or a hinge element and/or a folding mechanism. This leads to a mechanically simple solution for fastening or moving the kink element. For instance, the kink element may be designed in the form of a clamp with a hinge.

In a further embodiment, the kink element comprises an elastic basic body and bending-edge holding segments fastened thereto. The elastic basic body may e.g. consist of an elastic ribbon, a plastic material, a metal, etc., the bending-edge holding segments being producible from the same material or from a material differing from that of the basic body. When the same material is used, the bending-edge segments are preferably produced with an increased material thickness, so that the bending-edge segments provide for a mechanically relatively rigid bending edge.

In a further embodiment, the elastic basic body is configured such that a change in length and/or shape and/or a torsional movement is possible in the elastic basic body. Due to this property of the elastic basic body the kink element can be fastened in an easy way to the milk collecting piece, a transfer of one or several bending-edge holding segments being possible from the first position into the second position, e.g. by torsion in a sub-portion of the basic body.

In a further embodiment, the milk collecting piece comprises a connection element in each connection portion, the bending edge being positioned in front of the connection element such that upon the application of a force directed downwards relative to the longitudinal axis and the operative position onto the milk tube said tube is kinked along the bending edge without detaching from the connection element.

This embodiment prevents the above-mentioned wetting of the connection element on the bottom side of the connection element thanks to the inventive bending edge, so that the risk of bacterial contamination in this portion is reduced considerably.

Advantageously, the bending edge has a distance from the connection element edge of about 1 mm to 15 mm. With such a distance the milk tube is reliably prevented from detaching from the bottom side of the connection element during kinking of the milk tube.

In a further variant, the kink element is made tubular and can be detachably mounted in the connection portion on the milk tube. With the tubular configuration of the kink element said element can be mounted around the connection portion, thereby permitting a rapid and reliable installation. Preferably, the bending edge is designed as a member projecting from the tubular portion with a straight edge.

Preferably, the kink element comprises two shaped members and a closing element. The tubular kink element can thus be mounted rapidly and reliably.

In a further preferred embodiment, each connection portion comprises a surface with an opening for receiving the milk tube.

Hence, the milk collecting piece of said embodiment has no connection element, so that the risk of bacterial contamination that always exists in milk collecting pieces with connection elements is reduced considerably.

In a further embodiment, the milk collecting piece comprises a milk tube, the milk tube having an incision at least in part around the circumference of the milk tube on the first end portion to be introduced into the opening.

This constructional configuration of the milk tube guarantees that the milk tube is reliably held in the opening because the opening edge is in engagement with the incision and prevents an axial movement of the milk tube.

In a further variant, the outer diameter of the milk tube is greater on the first end portion to be introduced into the opening, at least in the area of the incision, than in the central portion of the milk tube.

The increased outer diameter results in an enhanced stability and service life of the milk tube because small deformations with a corresponding wear take constantly place in the area of the opening, which wear is thus negligible due to the increased material thickness.

In a further embodiment, the kink element has a support surface facing the milk tube.

Said support surface achieves an increased mechanical stability of the end portion of the milk tube. Furthermore, the support surface can be adapted to the radius of the milk tube, resulting in an improved guidance of the milk tube when lateral forces are acting on the milk tube.

Preferably, the milk tube has a bellows-like structure permitting a curvature or bend of the milk tube without a significant reduction of the inner diameter. The bellows-like structure provides for improved bending properties together with an adequate stability of the milk tube, whereby the attenuating or compensating mechanical effect is promoted during the milking operation. Furthermore, a targeted stimulating movement, which is e.g. created by a stimulation element, can be transmitted by the bellows-like structure to the teats. This is supported, on the one hand, by the improved curvature characteristics of the milk tube thanks to the bellows-like structure and, on the other hand, by the properties of the bellows-like structure to display a certain movability in axial direction.

Advantageously, the bending edge is positioned such that in the case of a force which is directed downwards with respect to the operative position and acts on the milk tube, the bending edge is in contact with the milk tube at the transition from the unstructured portion to the bellows-like portion or in the bellows-like portion.

It is thereby ensured that a portion of the milk tube of maximum flexibility is involved in the kinking of the milk tube.

According to a further aspect of the invention, a kink element is provided for use with a milk collecting piece having an obliquely arranged connection portion, the kink element comprising a kink segment with a bending edge and being configured to be mountable on the milk collecting piece.

It is possible by providing a mountable kink element to equip already existing milk collecting pieces with obliquely arranged connection portions in a simple way so that even in the case of old systems the above-described drawbacks can be avoided.

Advantageously, the kink element is removably mounted on the milk collecting piece. Hence, since a permanent connection is not needed between the milk collecting piece and the kink element, the kink element can be replaced any time or used on other milk collecting pieces. Moreover, the removable assembly of the kink element allows for a change in the position of the kink element in such a way that a rapid assembly or disassembly of the milk tubes is possible and/or the kink element can be removed altogether during assembly or disassembly of the milk tubes.

As for the further technical designs of the kink element, the criteria already outlined above as well as the associated advantages are applicable.

BRIEF DESCRIPTION OF THE DRAWING

Further embodiments according to the invention as well as advantages and objects of the invention are further defined in the patent claims and become also apparent from the following detailed description. In the accompanying drawings.

Embodiments of the present invention will now be described in detail.

DETAILD DESCRIPTION OF THE INVENTION

Figure 1:
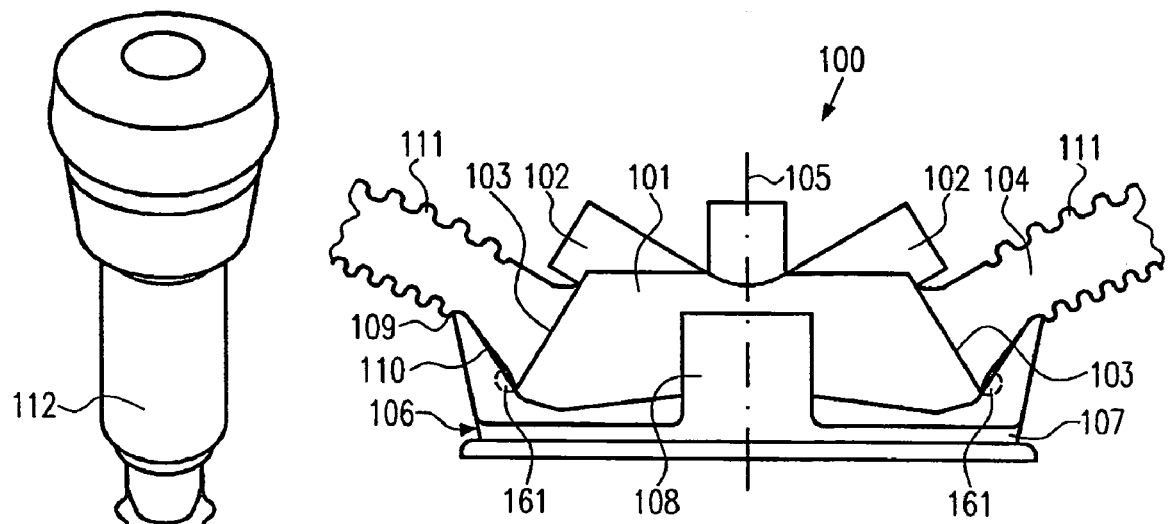
FIG. 1 shows a schematic side view of an embodiment of a milk collecting piece according to the invention.

FIG. 1 schematically shows a milk collecting piece 100, illustrating only the portions of relevance to the invention, i.e. the upper part of the milk collecting piece. The milk collecting piece 100 comprises a container body 101 with fluid or air supply elements 102 provided thereon, and with connection portions 103, each having a flexible milk tube 104 mounted thereon. Furthermore, the figure shows a longitudinal axis 105 the direction of which also coincides with the operative position of the milk collecting piece 100 when the milk collecting piece is suspended without motion, e.g. held by the milk tubes 104, underneath the udder of an animal to be milked,. Said vertical direction is also designated in the following as the operative position. Absolute directional information found in the description always refers to said operative position.

Furthermore, the milk collecting piece 100 has provided thereon a kink element 106 which comprises a basic body 107 and a plurality of bending-edge holding segments 108. Each bending-edge holding segment 108 comprises a bending edge 109 and a support surface 110 in the illustrated embodiment. Optionally, a recess 161 may be provided in the support surface 110 to receive a possibly existing thickened portion of the milk tube 104 therein. In the present embodiment, the basic body 107 and the bending-edge holding segments 108 are made from a uniform material, e.g. plastics, metal, etc., but the bending-edge holding segments and the basic body 107 may also be made from different materials. To be more specific, the bending-edge holding segment 108 may e.g. consist more or less of a frame. The milk tubes 104 which have a portion of a bellows-like structure 111 in the illustrated embodiment are fastened with an end portion to the connection portions 103 such that the milk tubes 104 extend on the connection portion 103 in a direction oblique to the longitudinal axis 105. A typical angular range is between 10° and 70°.

Figure 2:
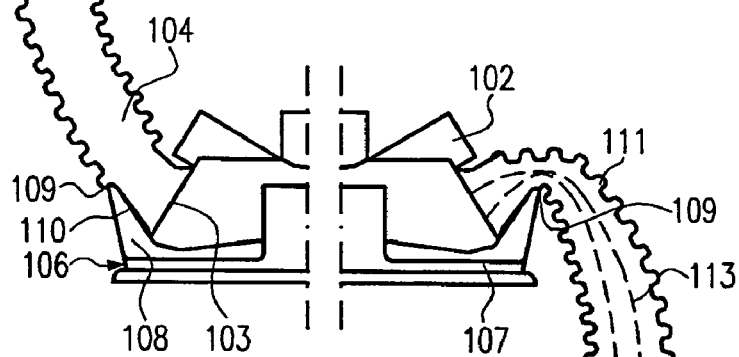
FIG. 2 the milk collecting piece of FIG. 1 in two functional positions.
Figure 2:
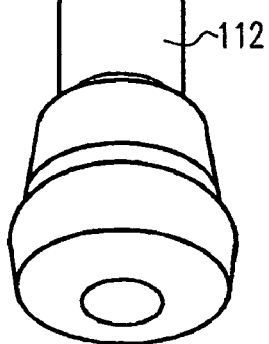

With reference to FIG. 2, the function of the milk collecting piece according to the invention will now be described. FIG. 2 shows two typical operative states of the milk collecting piece 100, with one teat cup 112 being oriented upwards and typically fastened to an animal's teat, and a further teat cup 112 being suspended downwards almost vertically. This situation arises for instance when the milking harness is removed or attached, the individual teat cups being attached or removed in successive order while the remaining teat cups are hanging downwards due to their own weight. In this situation the milk tube 104 is deformed by means of the bending edge 109 near the bending edge 109 so that the inner sides adhere to one another or are at least spaced-apart at a very close distance, as is shown by the broken line 113. Even if the interior of the milk tube 104 is not entirely closed, a complete contraction takes place due to the prevailing milking vacuum, so that a reliable maintenance of the operating vacuum in the interior of the container element 101 is ensured. Advantageously, the support surface 110 substantially prevents a mechanical deformation of the end portion of the milk tube 104. As a consequence, only a minimal relative movement takes place between the connection portion 103 and the end portion of the milk tube 104, so that the material fatigue of the milk tube 104 in this portion is negligibly low. In the position in which the left teat cup 112 is shown, the oblique exit of the milk tube out of the connection portion 103 leads to a curvature in the milk tube 104 that creates a mechanically attenuating effect, so that the individual teat cups 112 are decoupled more strongly in mechanical terms than would be the case if use were made of milk tubes vertically exiting upwards, as has been described at the outset. Moreover, the portion with the bellows-like structure 111 permits a certain axial flexibility that also compensates for an undesired relative movement between the individual teat cups and the milk collecting piece 100.

In the embodiment shown in FIGS. 1 and 2, the kink element 106 may preferably be designed such that the kink holding segments 108 are movable from a first position, which is shown in FIGS. 1 and 2, where the bending edge 109 is positioned such that the milk tube 104 is kinked in a definite way, into a second position in which one or several of the kink holding segments 108 are spaced apart from the milk tube 104 such that unhindered access to the connection portion 103 is possible. In one embodiment, the kink element 106 is made rotatable about the longitudinal axis 105, so that all of the kink holding segments 108 can be transferred from the first position into the second position at the same time. Alternatively, the individual kink holding segments may comprise a mechanism which permits movement of said segments individually from the first position into the second position. For instance, each kink holding segment 108 may comprise a snap type mechanism, a rotating mechanism, or the like, so that each kink holding segment 108 is e.g. movable by rotation or by folding down from the first position into the second position. Furthermore, the kink holding segments may be designed such that said segments are displaceable in axial direction, so that these can be transferred from the first position into the second position.

In a further embodiment, the basic body 107 of the kink element 106 may be made in part or entirely from an elastic material; for instance, the basic body 107 may be configured in the form of a stretchable ribbon, a deformable metal clip which can enclose the milk collecting piece 100 in part, so that e.g. the elastic metal clip can be opened easily by being slightly bent apart, whereby the bending-edge holding segments 108 mounted on the clip can be changed in their position. In the embodiment in which the basic body 107 consists of an elastic ribbon, the bending-edge holding segments 108 can be folded downwards easily by stretching and twisting the holding ribbon, which permits free access to the connection portions 103.

Figure 3:
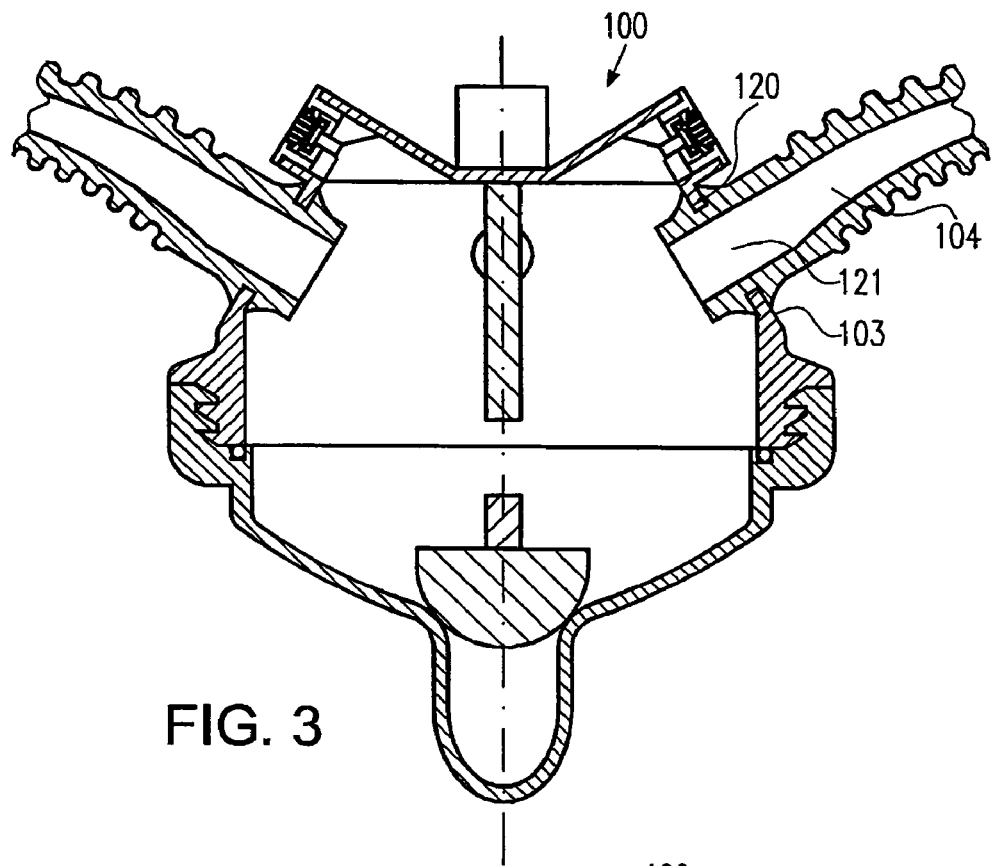
FIG. 3 a schematic side view of the inner portion of a milk collecting piece according to the invention, the kink element being not plotted.
Figure 4:
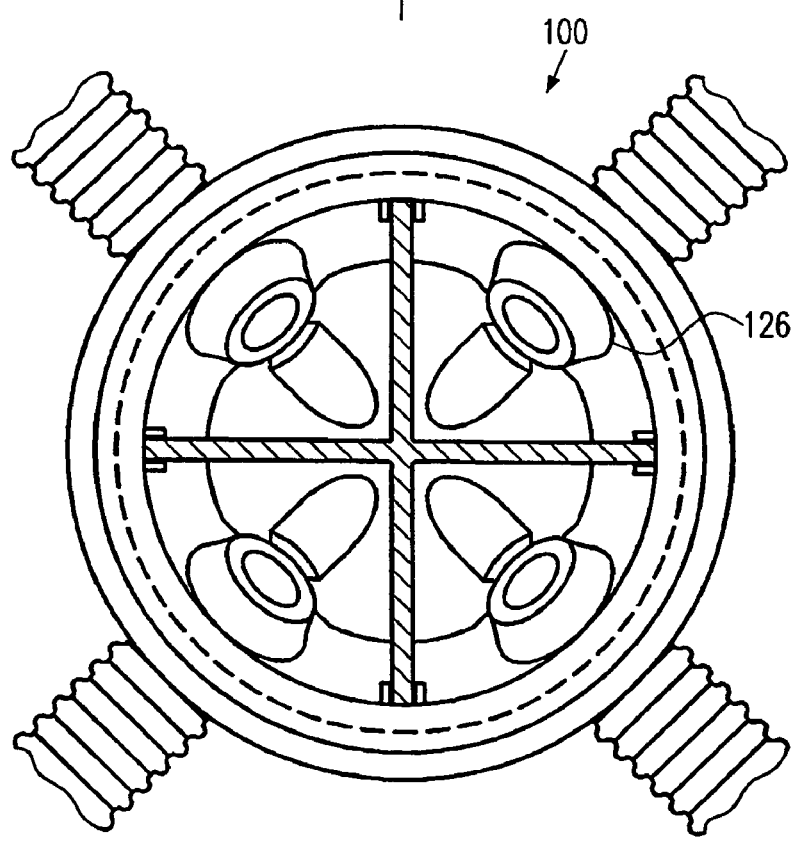
FIG. 4 a schematic top view on the milk collecting piece of FIG. 6.
Figure 5:
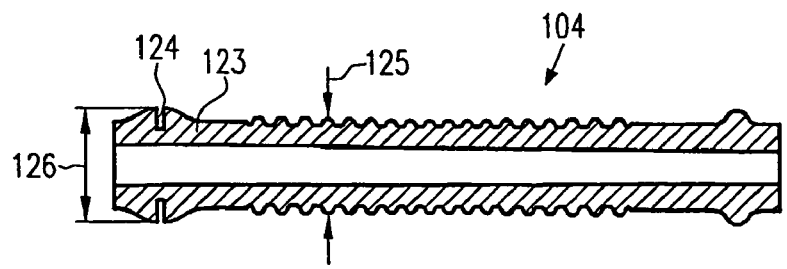
FIG. 5 a schematic view of a milk tube which can preferably be used in combination with the milk collecting piece shown in FIG. 6 and FIG. 7.

FIGS. 3, 4 and 5 show further details of the embodiments illustrated in FIGS. 1 and 2.

FIG. 3 is a schematic lateral inner view of the milk collecting piece 100. The connection portion 103 comprises a surface 120, the normal to the surface enclosing an angle advantageously ranging from 10° to 90° with the longitudinal axis 105. In the illustrated embodiment; said angle preferably ranges from 30° to 60°. It should be noted that angle always means the smaller angle between the longitudinal axis 105 and the connection portion 103, so that the milk tube 104 in the operative position exits from the milk collecting piece 100 with an upwardly oriented inclination. The surface 120 comprises an opening 121 into which the end portion of the milk tube is introduced.

FIG. 5 schematically shows a preferred embodiment of the milk tube 104, where an incision 124 is provided on an end portion 120. Furthermore, the outer diameter 126 of the end portion 123 in the area of the incision 124 is greater than an outer diameter 125 in the central portion of the milk tube 104.

FIG. 3 further shows that the edge of the opening 120 is in engagement with the incision 124, so that the milk tube 104 is reliably held in position when axial forces that are typical during the milking operation are acting on the milk tube 104. On the other hand, the milk tube 104 can be removed easily and rapidly, if necessary.

FIG. 4 is a top view on the milk collecting piece 100, the portion with the enlarged outer diameter 126 being clearly visible.

During operation there is hardly any relative movement between the milk collecting piece 100 and the milk tube 104 in the area of the surface 120 and the opening 121 due to the kink element 106 with the corresponding support surface 110 (cf. FIGS. 1 and 2), so that a long service life is achieved for the milk tube 104, especially when the area on the incision has the increased outer diameter 126. Furthermore, since there is either no or only a slight deformation of the milk tube 104 in the area of the surface 120, there are hardly any places at which milk could deposit for a prolonged period of time and thereby produce pathogenic bacteria, the reason for this being that the milk tube 104 cannot detach from the milk collecting piece. The necessary hygienic standards can thus be observed much more easily.

Figure 6A:
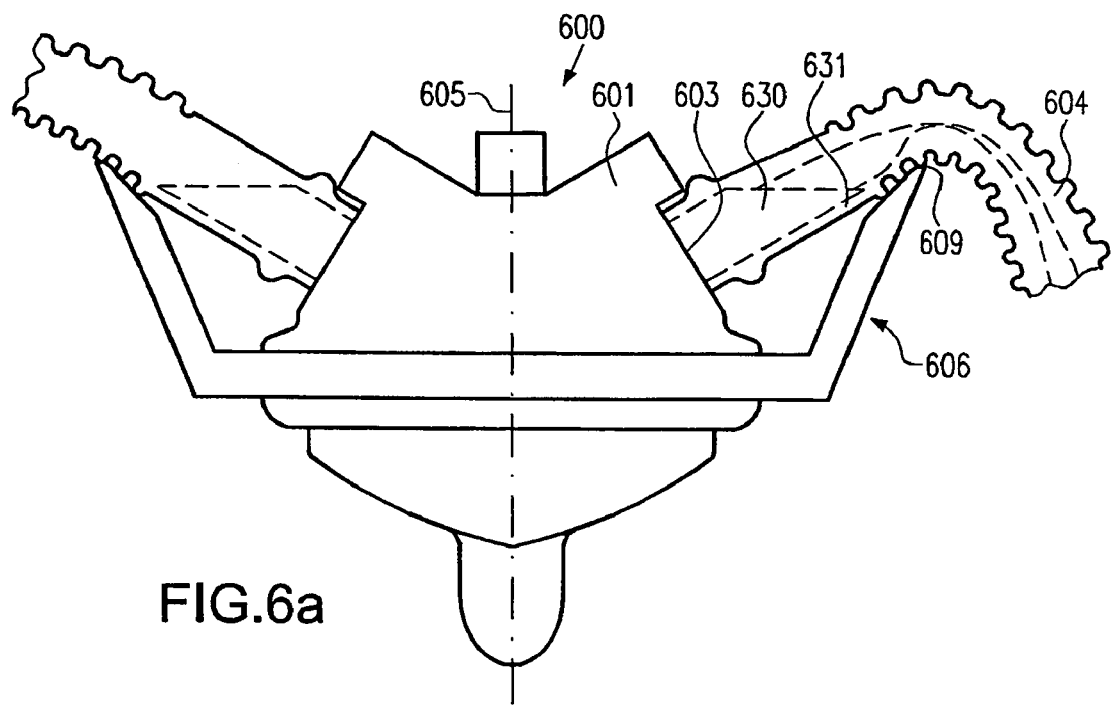
FIGS. 6a, 6b and 6c a schematic side view of variations of a further embodiment according to the invention, a milk collecting piece being used with obliquely mounted connection elements.
Figure 6B:
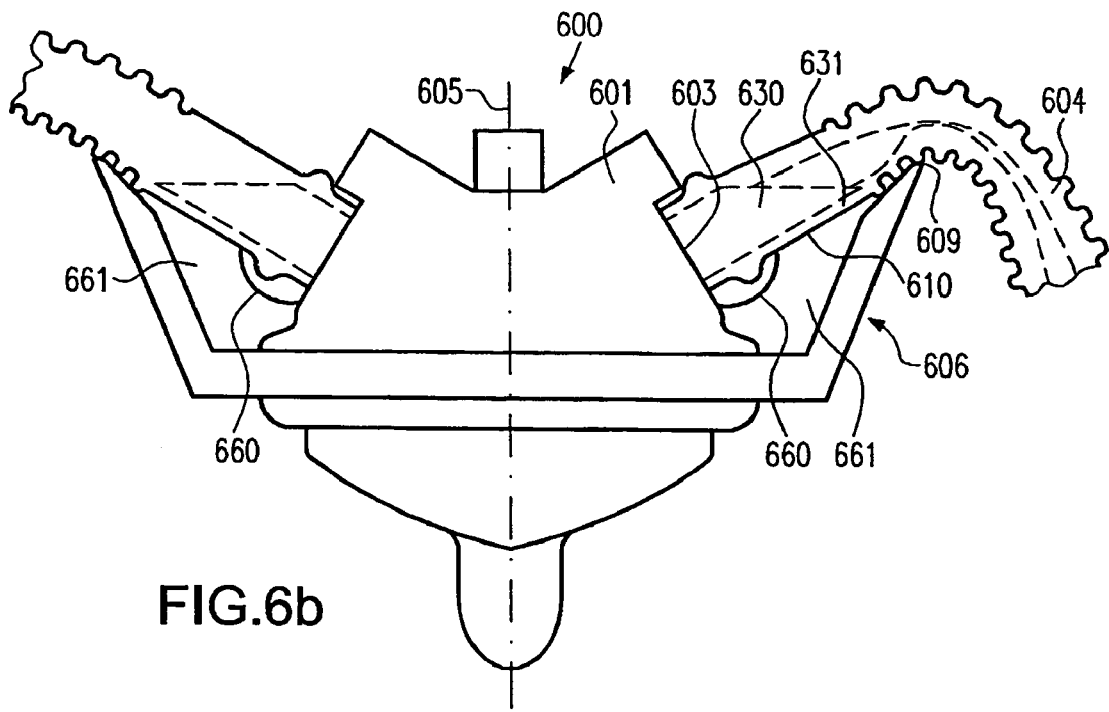
Figure 6C:
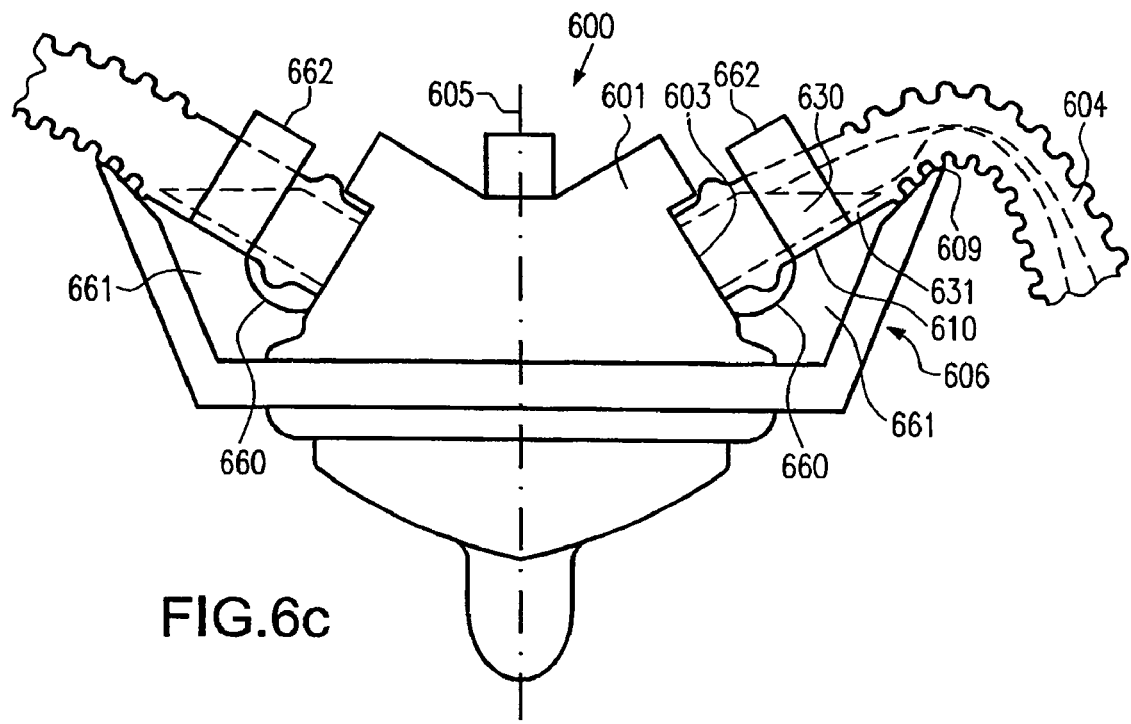

FIGS. 6a, 6b and 6c schematically show further embodiments of a milk collecting piece of the invention.

In FIGS. 6a to 6c, parts that are similar or identical to those shown in FIGS. 1 to 5 are marked with the same reference numerals, but with a leading "6" instead of the leading "1". The description of identical or similar parts is therefore omitted.

In FIG. 6a, the milk collecting piece 600 is provided in the connection portion 603 with a connection element 630 which is obliquely arranged relative to the longitudinal axis 605. The kink element 606 is here positioned such that the bending edge 609 is spaced apart from the connection element 630 in the direction in which the connection element 630 extends, so that the milk tube 604 is kinked on the bending edge 609 without the milk tube 604 detaching or lifting from a lower portion 631 of the connection element 630, as is the case with a conventional milk collecting piece. Preferably, the distance between the connection element 630 and the bending edge 609 is 1 mm to 15 mm.

Preferably, the kink element 606 is configured such that said element is removably mounted on the milk collecting piece 600. It is particularly advantageous that all constructional measures for fastening the kink element 606 are taken on the kink element, so that no structural measures have to be taken on the milk collecting piece 600 for fastening purposes. As a result, the kink element 606 can also be used with conventional milk collecting pieces. Of course, the kink element 606 and 106, respectively, may be permanently connected to a part of the milk collecting piece 600 in this embodiment and also in all of the other embodiments that have so far been mentioned, or it may be an integral component of the milk collecting piece 600. As for the configuration of the kink element 606, the same criteria as have already been outlined in connection with FIGS. 1 to 5, are applicable. In the case of the kink element 606, a support surface can be omitted because the mechanical stability of the end portion of the milk tube 604 is ensured by the connection element 630.

FIG. 6b shows a variation of the embodiment illustrated in FIG. 6a, a holding portion 661 being provided that forms a support surface 610 on which the milk tube 604 rests. Furthermore, a recess 660 may be provided for receiving a thickened portion of the milk tube 604. The support surface 610 reliably prevents the formation of a gap in the portion 631 during movement of the milk tube 604, so that essentially no milk residues can deposit there.

FIG. 6c shows a further variant of the embodiment illustrated in FIGS. 6a and 6b, a clamping device 662 being here provided in the rear portion of the connection element. The clamping device 662 may be designed as an annular element which encloses the milk tube 604 and thus the connection element 630 either in part or entirely. Furthermore, the clamping device 662 may be designed as a holding element with a bracket or a bracket-like structure, so that at least the milk tube 604 is pressed onto the connection element 630 at a place at the side opposite to the bending edge 609. The clamping device 662 may be fastened to the collecting piece 600 or to the kink element 606. The clamping device 662 may comprise a corresponding closing mechanism, so that the clamping device can be locked in the operative position.

Figure 7A:
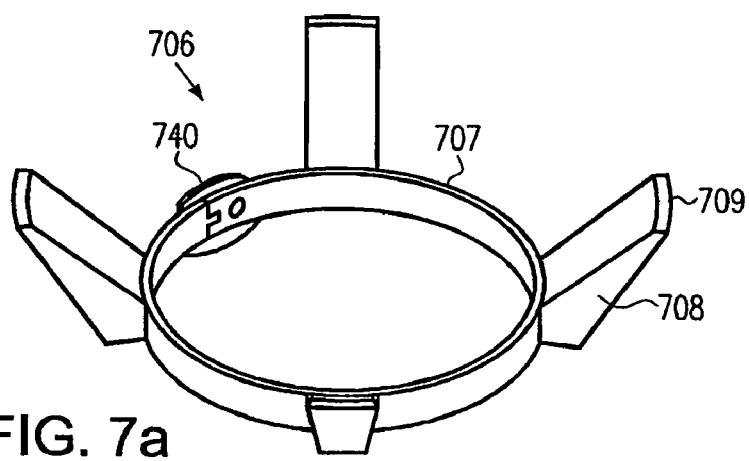
FIGS. 7a and 7b a schematic view of a kink element according to the invention, the element being e.g. usable in combination with a milk collecting piece with oblique connection portions, FIG. 7b showing the kink element additionally provided with a clamping device.

FIG. 7a schematically shows a kink element 706 of the invention that comprises a basic body 707 and bending-edge holding segments 708 with a corresponding bending edge 709. Furthermore, a closing element 740 is provided. In this embodiment, the basic body 707 is made from a material that is elastic at least in part, so that the annular basic body 707 can be opened, i.e. pressed apart, by operating or opening the closing element 740. Advantageously, the elasticity of the basic body 707 is so pronounced that the kink element 706 can be slid thereonto from the bottom or top (when all of the connection tubes on the milk collecting piece have been removed) or can be mounted from the side on condition that the basic body 707 can be opened to a sufficiently wide degree. Thanks to the closing element 740, the kink element 706 can be mounted in a reliable manner on a milk collecting piece on the one hand, and the bending edges 709 can be moved by opening the closing element 740 and by rotating the basic body 707 from a first position into a second position on the other hand. In a further embodiment the kink element 706 may comprise a hinge element so that two or more portions are created on the basic body 707, said portions being movable relative to one another. A particularly simple embodiment is obtained if the basic body consists essentially of an elastic ribbon to which the bending-edge holding segments 708 are fastened.

The bending-edge holding segments 708 may here be configured such that these have to be fastened to the basic body 707 after the basic body 707 has been fastened or attached to a milk collecting piece. To this end the bending-edge holding segments 708 may comprise an appropriate fastening mechanism, for instance an incision, a clip type closure, a press contact with a correspondingly mating point on the basic body 707, etc. Due to the elasticity of the basic body 707 each of the individual bending-edge holding segments 708 can then be moved by twisting, i.e. by torsional movement of the basic body 707, from a first position into a second position. For instance, a bending-edge holding segment 708 can easily be pulled away from the milk collecting piece to some extent and then be folded downwards. When corresponding fastening means are provided, the bending-edge holding element 708 can be disassembled rapidly and easily, so that corresponding connection portions of the milk collecting piece are accessible for assembling or disassembling the milk tubes. Furthermore, a locking means may be provided, for instance in the form of a ring or a ribbon, etc., which is laid around all bending-edge holding segments 708, so that an adequate mechanical stability is ensured in the first position. Depending on the type of the milk collecting piece with which the kink element 706 is to be used, the bending-edge holding segments 708 may comprise a support surface. As has already been explained in connection with FIGS. 1 and 2, a support surface is of advantage to a milk collecting piece with an inclined exit surface without a connection element because a high stability of the milk tube is thereby achieved in the connection portion. Advantageously, the support surface can partly imitate the radius of the milk tube, resulting in a certain guidance of the milk tube by the support surface. Of course, the basic body can be made fully or in part from inelastic materials. For instance, the basic body 707 may be any desired frame element whose inner portion is adapted to the shape of the milk collecting piece.

Figure 7B:
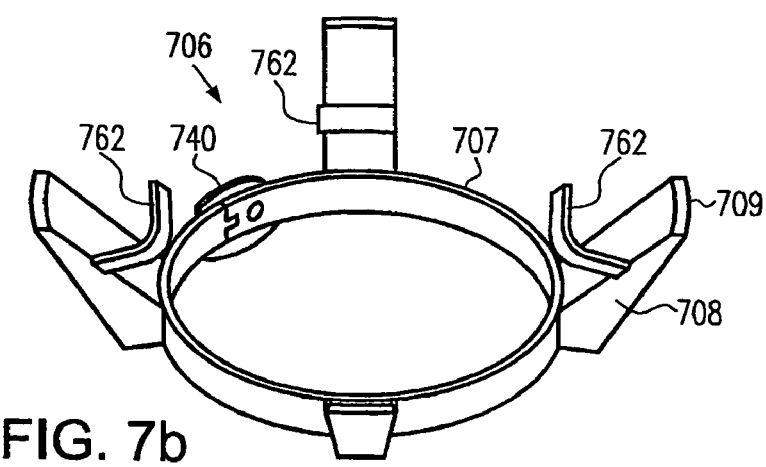

FIG. 7b shows the kink element of FIG. 7a with additional clamping devices 762 which in this example are designed as brackets fastened to the bending-edge holding segments 708. This particularly simple construction makes it possible to move the clamping device 762 also into the operative position by positioning, e.g. rotating, the kink element. However, the same standards are applicable to this embodiment with respect to the clamping device 762 as with respect to the clamping device 662 of FIG. 6c. This means that the clamping device may e.g. be configured as an annular element with a corresponding closure, etc.

During operation it is substantially ensured by the clamping devices 662 and 762 that a gap does not form between a connection element and the milk tube both in the position illustrated in FIG. 2 (position during removal of the milking harness) of the right teat cup 112 and in the position (position during milking) of the left teat cup 112. This considerably reduces the amount of milk residues collecting in the area between the milk tube and connection element or prevents such a collection altogether, resulting in increased hygienic standards.

Furthermore, it should be noted that the kink elements as illustrated in the figures are shown for use with milk collecting pieces having an essentially round cross-section.

The outer shape of the milk collecting pieces, however, is of no importance to the present invention, and the shape of the kink element can be adapted in an easy way to any desired outer shapes of the milk collecting piece. Furthermore, the remarks made in connection with the kink elements 106 and 606 with respect to FIGS. 1 to 6 apply by analogy to the kink element 706. Especially the selection of the materials and the outer shape, as well as the exact shape of the bending-edge holding segments must be considered to be not restricted by the detailed description. Furthermore, any suitable fastening means may be used for mounting the kink element on the milk collecting piece.

The invention claimed is:

1. A milk collecting piece for an automatic milking system, comprising:
   a plurality of connection portions configured to connect to flexible milk tubes and having a longitudinal axis, first end portions of the milk tubes fastenable to the milk collecting piece in a direction oblique to the longitudinal axis;
   a kink element comprising a bending edge spaced apart from the connection portion, said bending edge defining a bending portion in the flexible milk tube when fastened to the milk collecting piece, each bending edge being configured to be movable from a first position in which the bending edge is positioned to kink the milk tube, into a second position in which the bending edge is spaced apart from the milk tube, the bending edge being in the second position provides access to said connection portion for assembling or disassembling the milk tube.

2. The milk collecting piece according to claim 1, wherein the first end portions of the milk tubes in the fastened state enclose an angle of 10° or more with the longitudinal axis if said axis is oriented in a direction defined by an operative position of the milk collecting piece.

3. The milk collecting piece according to claim 1, wherein the kink element is movable so that some or all of the plurality of bending edges are simultaneously movable from the first position into the second position.

4. The milk collecting piece according to claim 3, wherein the kink element is rotatably fastened to the milk collecting piece.

5. The milk collecting piece according to claim 1, wherein the kink element is removably fastened to the milk collecting piece.

6. The milk collecting piece according to claim 1, wherein the kink element is displaceable from the first position into the second position in vertical direction with respect to an operative position.

7. The milk collecting piece according to claim 1, wherein the kink element comprises a plurality of bending-edge holding segments.

8. The milk collecting piece according to claim 7, wherein each bending-edge holding segment is movably mounted on the kink element.

9. The milk collecting piece according to claim 8, wherein each bending-edge holding segment comprises at least one of a rotating mechanism, a folding mechanism and a configuration to allow displacement of the bending-edge holding segment so as to be movable from the first position into the second position.

10. The milk collecting piece according to claim 7, wherein the kink element comprises a locking means with which each bending-edge holding segment can be locked in the first position.

11. The milk collecting piece according to claim 10, wherein the locking means is configured to lock all of the bending-edge holding segments in the first position at the same time.

12. The milk collecting piece according to claim 1, wherein the kink element comprises a deformable area configured so that the kink element can be removably fastened to the milk collecting piece by deformation of the deformable portion and/or can be locked in the first position.

13. The milk collecting piece according to claim 12, wherein the deformable portion comprises an elastic material.

14. The milk collecting piece according to claim 1, wherein the kink element comprises at least two sub-portions that are movable relative to one another.

15. The milk collecting piece according to claim 14, the at least two sub-portions are configured to be connectable by a closing element.

16. The milk collecting piece according to claim 14, wherein the at least two sub-portions are movable relative to one another by means of a deformable portion connecting the two sub-portions.

17. The milk collecting piece according to claim 16, wherein the deformable portion comprises at least one of an elastic material, a hinge element and a folding mechanism.

18. The milk collecting piece according to claim 1, wherein the kink element comprises an elastic basic body and bending-edge segments fastened thereto.

19. The milk collecting piece according to claim 18, wherein the elastic basic body is configured to allow a change in at least one of length, shape and a torsional movement in the elastic basic body.

20. The milk collecting piece according to claim 1, wherein the milk collecting piece comprises a connection element in each connection portion, the bending edge being positioned in front of the connection element such that upon a force exerted on the milk tube, which is directed downwards relative to the longitudinal axis and the operative position, said milk tube is kinked along the bending edge without detaching from the connection element.

21. The milk collecting piece according to claim 20, wherein the bending edge has a distance of about 1 nun to 15 mm relative to the connection element and in axial direction.

22. The milk collecting piece according to claim 1, wherein each connection portion has a surface with an opening for receiving the milk tube.

23. The milk collecting piece according to claim 22, wherein the milk collecting piece comprises a milk tube, the milk tube having an incision at least in part around the circumference of the milk tube on the first end portion to be introduced into the opening.

24. The milk collecting piece according to claim 23, wherein an outer diameter of the milk tube on the first end portion to be introduced into the opening is greater at least in the area of the incision than in a central area of the milk tube.

25. The milk collecting piece according to claim 23, wherein the milk tube has a bellows-like structure.

26. The milk collecting piece according to claim 25, wherein the milk tube comprises an unstructured portion between the end portion introduced into the opening and the bellows-like structure so that upon occurrence of a bending load the curvature of the milk tube is created essentially from the bellows-like structure onwards.

27. The milk collecting piece according to claim 26, wherein the bending edge is positioned such that upon a force directed downwards with respect to the operative position and acting on the milk tube, the bending edge is in contact with the milk tube at at least one of the transition from the structured portion to the bellows-like portion and in the bellows-like portion.

28. The milk collecting piece according to claim 1, wherein the kink element comprises a support surface facing the milk tube.

29. The milk collecting piece according to claim 1, further comprising a clamping device configured to fixedly clamp the milk tube in the fastened state in flow direction behind the bending edge at least at the side opposite to the bending edge.

30. The milk collecting piece according to claim 29, wherein the milk collecting piece comprises a connection element in the connection portion, and the clamping device is configured to essentially prevent the formation of a gap between the connection element and the milk tube in the fastened state during operation.

31. The milk collecting piece according to claim 29, wherein the clamping device is fastened to the kink element and configured to enclose the milk tube in the fastened state at least in part.

32. A kink element for use with a milk collecting piece with an obliquely arranged connection portion, the kink element comprising:
a kink segment including a bending edge and being configured to be mountable on the milk collecting piece, the kink element being further configured to be movable in the mounted state from a first position in which the bending edge is positioned to kink the milk tube, into a second position in which the bending edge is spaced apart from the milk tube such that the connection portion is accessible for assembling and disassembling the milk tube.

33. The kink element according to claim 32, wherein the kink element is removably mountable on the milk collecting piece.

34. The kink element according to claim 32, wherein the kink element comprises a basic body which has the kink segment fastened thereto.

35. The kink element according to claim 34, wherein the kink segment is movably fastened to the basic body.

36. The kink element according to claim 32, wherein a plurality of kink segments are provided on the basic body.

37. The kink element according to claim 32, wherein the kink segment is movable from a first position into a second position.

38. The kink element according to claim 37, wherein the kink segment is movable by displacement from the first position into the second position by means of at least one of a rotating, folding mechanism and an inherent elasticity of the basic body.

39. The kink element according to claim 32, wherein the basic body comprises a closing mechanism for fastening the basic body to the milk collecting piece.

40. The kink element according to claim 39, wherein comprises at least one of an elastic portion and a hinge element.

41. The kink element according to claim 32, wherein a plurality of kink segments are provided and the basic body is so elastic that said segments can be fastened by inherent elasticity to the milk collecting piece.

42. The kink element according to claim 32, wherein the basic body comprises one of a ring segment-like member and an annular portion.

43. The kink element according to claim 32, further comprising a clamping device configured to fixedly clamp a milk tube at a side opposite to the bending edges.

* * * * *